United States Patent [19]
Ohlin, Jr.

[11] Patent Number: 5,343,657
[45] Date of Patent: Sep. 6, 1994

[54] METHOD AND APPARATUS FOR MASKING REMOVABLE OPTICAL LENS MARKINGS DURING LENS GRINDING

[75] Inventor: John R. Ohlin, Jr., Sandy, Utah

[73] Assignee: Venture Tape Corporation, Rockland, Mass.

[21] Appl. No.: 947,706

[22] Filed: Sep. 18, 1992

[51] Int. Cl.⁵ .............................................. B24B 1/00
[52] U.S. Cl. ...................................... 451/29; 451/42; 451/390
[58] Field of Search ............... 51/310, 216 LP, 217 L, 51/312, 284 R, 326

[56] References Cited

U.S. PATENT DOCUMENTS

| | | | |
|---|---|---|---|
| 4,221,083 | 9/1980 | Carroll | 57/216 LP |
| 4,925,518 | 5/1990 | Wasserman et al. | 51/216 LP |
| 4,942,696 | 7/1990 | Winthrop et al. | 51/216 LP |

Primary Examiner—M. Rachuba
Attorney, Agent, or Firm—Wolf, Greenfield & Sacks

[57] ABSTRACT

A method and apparatus for protecting removable markings on an optical lens during grinding thereof to a desired prescription. A mask is placed over the markings prior to application of an adhesive tape, to which a low temperature alloy block is bonded for holding of the lens during grinding. The mask preferably covers only the markings, and is transparent to allow alignment thereof. Preferably the mask is held in place on the lens surface without the use of an adhesive, although a low tack adhesive may be used which does not remove the markings when the mask is peeled away from the lens. A preferred material for the mask is a static cling vinyl.

16 Claims, 3 Drawing Sheets

METHOD AND APPARATUS FOR MASKING REMOVABLE OPTICAL LENS MARKINGS DURING LENS GRINDING

FIELD OF THE INVENTION

This application relates generally to the preparation of optical lenses for eyeglasses, and more particularly to a method and apparatus for protecting removable visual alignment markings on lenses during the grinding operation.

BACKGROUND OF THE INVENTION

Lenses for eyeglasses typically are prepared by a laboratory by customizing lens blanks which are prepared by the manufacturer. These stock lens blanks come in standard sizes and shapes and the laboratory must grind and polish the blanks to the proper prescription and to the shape required for insertion into a particular style of frame.

Although the precise method of preparation of the lenses varies from laboratory to laboratory and with different types of lenses, there are certain techniques which are commonly used by many laboratories, and these will be described hereinbelow.

In most laboratories, tape is used to grasp the lens blank during grinding. The lens blank is first placed in a tape applicator machine with a convex side being exposed. Tape is then adhered to the convex side of the lens blank. The tape, is drawn onto the convex side of the lens by a vacuum while the lens resides in the machine. The use of the vacuum ensures that the tape is tightly bonded to the lens, and that it is stretched over the lens to conform to its shape. This stretching process provides a tighter bond and removes any wrinkles or other imperfections in the tape. This tape is typically made of a plastic material, such as polyethylene, and can be stretched upon the application of pressure to conform to the shape of the surface of the lens blank and grasp it tightly. A typical example of such a tape can be purchased from Venture Tape Corp., under the product designation Blocker Tape. With the tape tightly stretched over the lens blank, a circular ring is clamped over the lens, pressing the tape tightly against the lens surface and stretching the tape to conform to the shape of the lens surface. Using the inside surface of the ring as a guide, excess tape is then cut away so that the tape does not extend beyond the outer perimeter of the lens blank. The lens, with the tape attached to its convex surface, is removed from the machine.

The lens blank is then placed in a blocking machine in which a low-temperature metal alloy is melted and injected into a mold in direct contact with the tape. Typically, The alloy used melts either at a temperature of about 117° Fahrenheit or of about 155° Fahrenheit. This alloy is then allowed to cool. The alloy is of such a nature that it forms a mechanical bond with the tape when cooled. The mold is then removed to reveal a metal block which is formed of the alloy and which is bonded to the tape on the lens blank.

The block with the lens blank secured thereto is then mounted in a generator, and the concave side of the lens blank is ground to the desired prescription. Thereafter, the block is mounted again in a polishing machine in which the concave side of the lens blank is polished. The block may also be manually held for further grinding of the edges of the lens blank and polishing thereof.

When all of the grinding and polishing operations on the lens blank have been completed, a deblocking ring is used to remove the block. The lens blank is rapped while in the blocking ring until the block falls off through a hole, after which the block may be melted and reused. Thereafter, the tape is peeled off the lens blank. Finally, the lens blank is edged to shape it to fit into a frame selected by the user.

For certain lenses, it is necessary to provide visual markings on the lens blank so that the laboratory technician knows how the lens is to be mounted in the frame and so that the lens is properly oriented when the lens is sized and shaped to fit into the frame after it has been ground to a prescription. In the absence of these visual markings, the lens may be improperly edged or edged in such a way that the lens is mounted in the frame out of proper alignment. This problem is particularly acute with so-called progressive lenses in which the prescription changes progressively from top bottom. In progressive lenses, there are no visually identifiable features which allow proper orientation of the lens, such as are found in conventional bifocal lenses. Bifocal lenses display a readily observable discontinuity, which allows one to determine the top and bottom of the lens. Thus, it is impossible to determine which is the top or bottom of a progressive lens. These progressive lenses would be useless if they were mounted sideways so that the prescription changed from side to side or were mounted upside down so that the portion of the lens used for reading was at the top and that used for long distance viewing was at the bottom.

Typically, the lens blanks are marked with visible ink indicia by the manufacturer to allow proper alignment of the lens. This ink, however, must be removable after the lens has been mounted, so that it does not interfere with viewing. Thus, the ink cannot be etched into the lens blank. Also, the ink must be disposed on the convex side of the lens blank, since all of the grinding occurs on the concave side. Such grinding would obviously remove any markings placed there by the manufacturer. However, the ink used on the convex side, if not etched into the lens blank, typically is removed by the tape after the grinding process has been completed. It is at this time when the markings are actually needed, so that the lens can be properly oriented.

One solution to this problem was to use ink which is visible only under ultraviolet light and which is etched into the lens. Therefore, after removal of the tape, the lens can still be properly oriented by the laboratory technician using ultraviolet light. The technician typically views the lens in ultraviolet light, and places a temporary marker on the lens which is aligned with the etched ink indicia, and which is visible in ordinary light. This marker is then removed when the lenses are inserted into the frames. However, this solution typically requires a large amount of the technician's time to precisely align the marker on the lens under ultraviolet light. This extra step significantly increases the cost of the lens as well as decreases the production rate of the laboratory. The marker used typically is a type of vinyl which clings to glass, such as static cling vinyl. Such a marker remains aligned on the lens during the edging operation, but can be quickly removed from the lens when finished without leaving any residue and without damaging the lens.

It is therefore an object of the present invention to eliminate the added step of placing a visible marker on the lens after the grinding operation has been completed.

It is another object of the present invention to provide a method and apparatus for allowing the use of visual markings on the lens which are visible in ordinary light which remain after the grinding process for proper alignment of the lens, but which can be removed quickly and readily once the lens has been mounted in the frame.

It is a further object of the present invention to reduce the time required for grinding and mounting of lenses in an eyeglass frame.

It is yet another further object of the present invention to provide a method and apparatus which permits the use of markings on a lens for alignment of the lens which are visible in ordinary light but which can be readily removed when necessary, which method and apparatus use existing apparatus and do not require significant changes in the present methods and apparatus used for grinding lenses.

SUMMARY OF THE INVENTION

These and other objects are achieved by the present invention which relates to a method and apparatus for masking the markings on an optical lens prior to application of the tape so that the markings are not lifted off by removal of the tape when the grinding and polishing operations are completed.

The method of this invention includes the step of covering the markings on the surface of the lens with a mask. The tape is then applied to the convex side of the lens over the mask, so that the adhesive on the tape does not come in contact with the markings. The tape covering the mask holds the mask in place to prevent slippage during the operation. Once the grinding and polishing operations have been completed, the tape is removed and the mask is lifted off the lens without removal of the markings. The operator can then move to the next step in the lens finishing process without the necessity of remarking the lens.

The mask comprises a material which will adhere to the lens surface, but which will not adhere so tightly that it lifts off the markings thereon. Preferably, the mask is of a shape which covers and protects all the markings used on most eyeglass lenses, regardless of the lens, but which is not so large as to interfere with the adhesion of the tape to the lens. Thus, the mask should not cover any area larger than is necessary to cover the markings. A preferred shape includes four lobes which extend from a central area. Typically, the lobes in one direction extend farther than the lobes in the opposite direction, and each lobe is preferably offset from the other by approximately 90°. A preferred material is a static cling vinyl. Other acceptable materials include conventional tapes carrying a low tack adhesive.

The foregoing method and apparatus permits an operator to utilize the conventional method of applying a tape to a lens blank for attachment of a block to be used in a chuck, without fear of removal of the markings, and therefore without the necessity of subsequently remarking the lens after the grinding and surfacing operations have been completed. This procedure saves both time and money.

BRIEF DESCRIPTION OF THE DRAWINGS

The objects, advantages and features of this invention will be more clearly appreciated from the following detailed description when taken in conjunction with the accompanying drawings, in which.

DETAILED DESCRIPTION OF THE PREFERRED EMBODIMENTS

With reference now to the drawings and more particularly FIGS. 1–10 thereof, the method of this invention will now be described. This method has particular applicability to optical lens blanks which have two or more zones in the lens and in which the transition between zones is not readily visually apparent. Such lenses are often referred to as progressive lenses, and include three separate zones, one zone for reading, another zone for viewing objects at a distance, and a third transition zone between the first and second zones. With such lens blanks, it is difficult, if not impossible, to assure proper orientation or alignment of the lenses during grinding and placement in the eyeglass frames without visually observable markings on the lens blank which allow the lab technician to properly position the lens during preparation thereof. As described, these markings typically are in ink, such as yellow ink, which is readily visible to the observer. This ink is not etched into the glass, so that it can be buffed off quickly and completely once the eyeglasses are ready for installation in the frame, so that the markings do not interfere with the vision of the user. Such ink markings are often screen printed onto the lens blanks. It is to be understood, however, that the method and apparatus of this invention are equally applicable to any other type of lens blank which requires the use of visible markings thereon for alignment purposes, or for other purposes, which markings must be removed without damaging the lens. This invention is also equally applicable to either glass or plastic lens blanks which have to be ground to the desired prescription prior to use.

Figure 1:
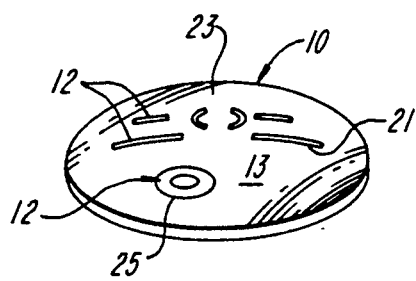
FIG. 1 is a pictorial view showing a lens blank with which the method and apparatus of this invention are used and which has typical markings thereon.

FIG. 1 illustrates a typical lens blank 10 as is obtained from the manufacturer prior to grinding. Lens blank 10 is shown with typical orientation markings 12 which typically, although not necessarily, are in yellow ink. Markings 12 are disposed on the outer, convex surface 13 of blank 10. As can be seen in FIG. 1, typical markings 12 include a series of dashed lines 21 extending horizontally through approximately the center of lens blank 10, a pair of parentheses 23 on one side of the dashed lines, and a circle 25 opposite the parentheses on the other side of the dashed lines. Parentheses 23 and circle 25 are reference points. Parentheses 23 are typically for the distance power of the lens, while the circle 25 is for the near power. While the spacing and location of these markings 12 will vary somewhat from lens to lens, typically markings 12 have the general shape and orientation shown in FIG. 1.

Figure 2:
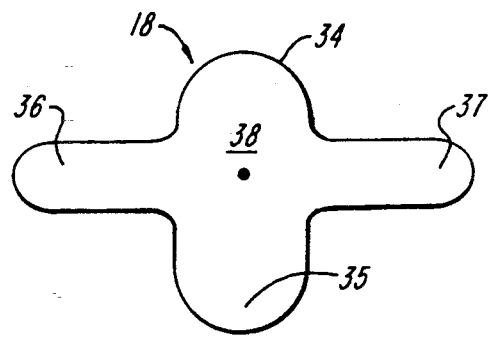
FIG. 2 is a perspective view showing a typical mask of this invention.
Figure 3:
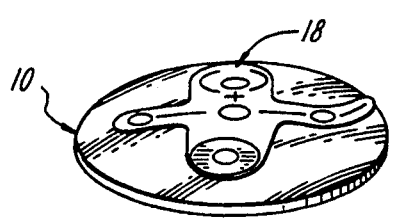
FIG 3 is a pictorial view showing the mask of FIG. 2 being applied to the lens blank of FIG. 1.

FIG. 2 illustrates a typical mask 18 of this invention while FIG. 3 shows its application to lens blank 10 to cover markings 12. Mask 18 can be applied to lens blank 10 anytime prior to application of tape 20, including at the factory where lens blank 10 is manufactured, or by the laboratory technician after receipt of lens blank 10, or after placement of lens blank 10 into cavity 14 of tape applicator machine 16, to be described (FIG. 4).

Figure 4:
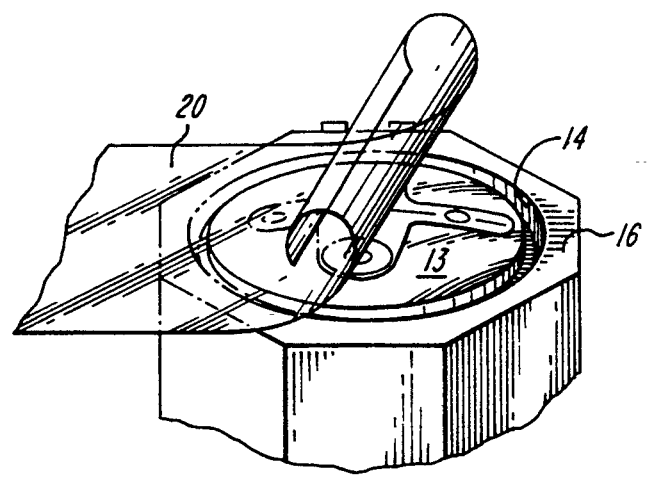
FIG. 4 is a pictorial view of the tape applicator machine illustrating the application of the tape.
Figure 5:
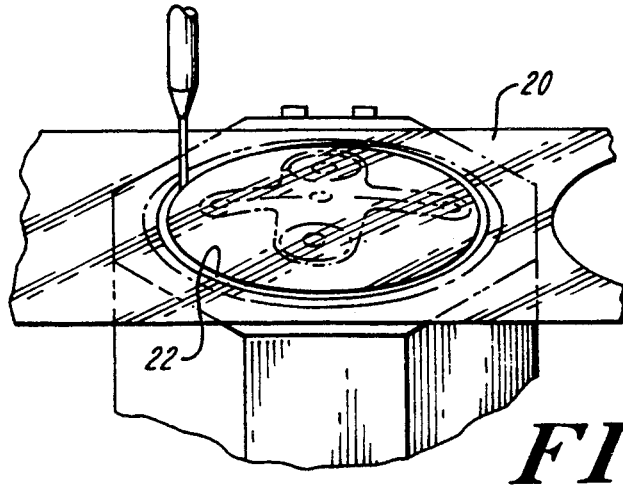
FIG. 5 is a pictorial view of the tape applicator machine illustrating the cutting away of excess tape.

With reference now to FIG. 4, lens blank 10 next is placed in a cavity 14 of a tape applicator machine 16. As shown in FIG. 4, lens blank 10 is always placed in cavity 14 such that convex surface 13 faces upwardly, and concave surface 15 (FIG. 6.) of the lens blank 10 faces downwardly into the bottom of cavity 14. Mask 18 is applied to convex surface 13 of lens blank 10 either while blank 10 resides in cavity 14 or before, to cover markings 12. Tape 20 is then secured to convex surface 13 of lens blank 10 by tape applicator machine 16 in a manner well known to those skilled in the art. Tape 20 is manually drawn across the top of cavity 14, and a vacuum created within cavity 14 draws tape 20 downwardly around and onto the convex surface 13 of lens blank 10. The vacuum applied to tape 20 causes it to stretch about lens blank 10 to conform to surface 13 and to become securely adhered thereto. Tape 20 may be any conventional tape typically used for this process, such as a modified polyethylene or polyolefin tape with a high tack adhesive on the side facing the convex surface 13 of lens blank 10. A typical example of such a tape is one sold by Venture Tape Corp. under the product designation Blocker Tape.

Figure 6:
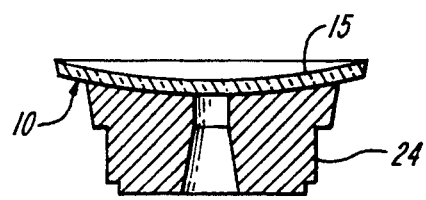
FIG. 6 is a cross-sectional side view of the lens blank with the block attached.

Once tape 20 has been applied to lens blank 10, ring 22 is pressed against convex surface 13. Ring 22 is a part of tape applicator machine 16, and serves as a guide for the technician using a knife to cut away excess tape from the lens, so that no tape extends beyond the edges of lens blank 10 to interfere with the subsequent grinding and surfacing processes. This operation is illustrated in FIG. 6.

Figure 7:
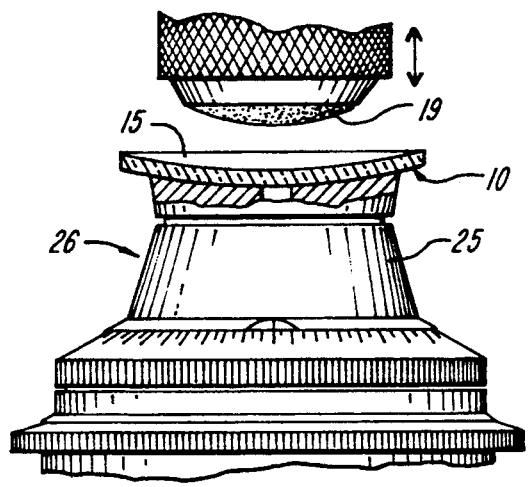
FIG. 7 is a pictorial view illustrating grinding of the lens blank.
Figure 8:
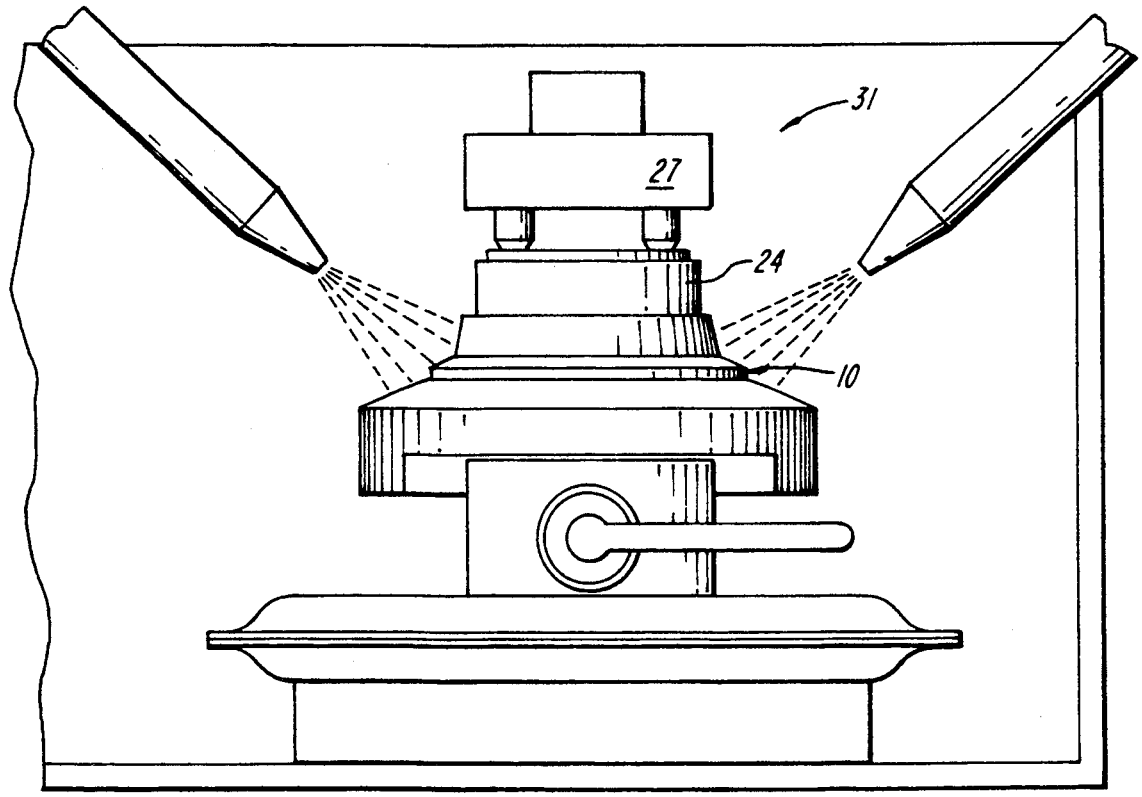
FIG. 8 is a pictorial view illustrating polishing of the lens blank.

Thereafter, lens blank 10 is removed from machine 16 and placed in a mold (not shown) in which a low temperature alloy is melted and poured into the mold in contact with tape 20 on the convex surface 13. The alloy is allowed to cool, the mold is removed, and the result is that a block 24 of this low temperature alloy remains affixed to tape 20 on lens blank 10, as illustrated in FIG. 6. This process is well known to those skilled in the art, and need not be described further. The composition of block 24 is also well known to those skilled in the art, and typically comprises a tin or lead based alloy which has a melting temperature of approximately 117° Fahrenheit. Block 24 allows mounting of lens blank 10 in a chuck 25 in a grinding machine, commonly referred to as a generator 26, where the concave surface 15 of lens blank 10 is ground by grinder 19 to the desired prescription, as illustrated in FIG. 7. Thereafter, the lens is polished in a slurry bath on a polishing machine 31 in which the block 24 again allows mounting of the lens in a chuck 27 during The polishing operation, as illustrated in FIG. 8.

Figure 9:
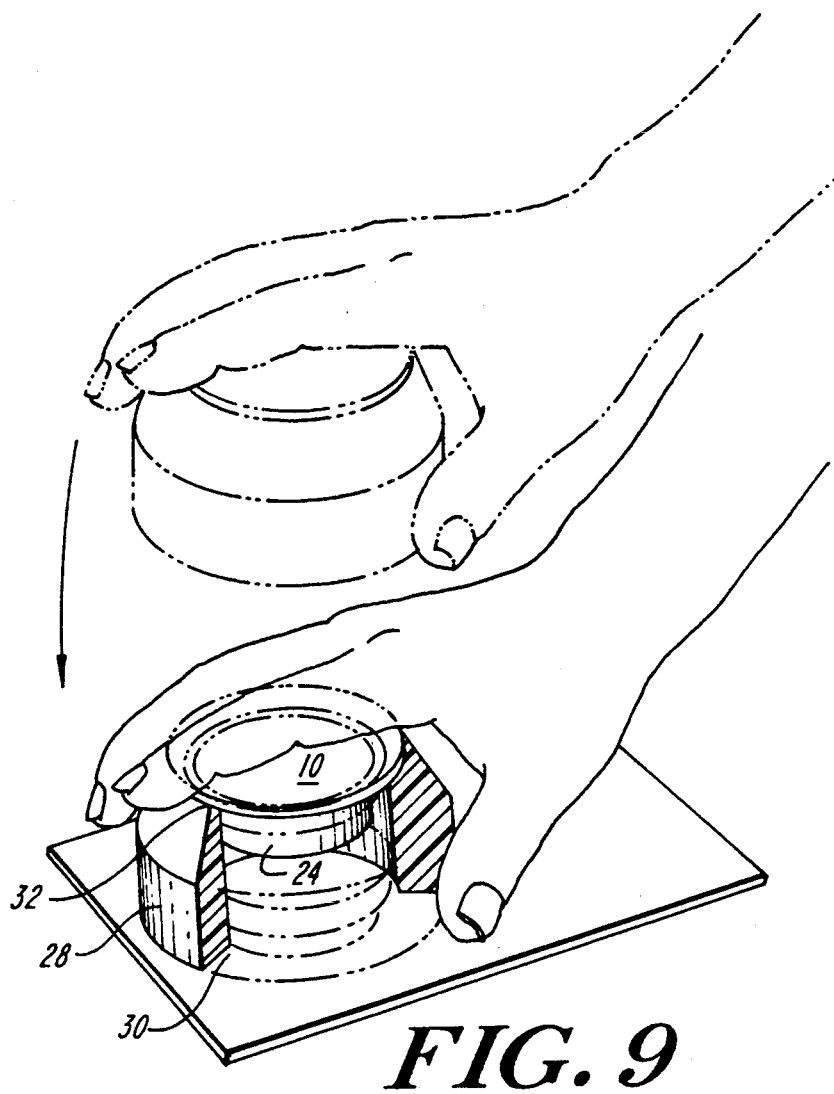
FIG 9 is a pictorial view illustrating removal of the block from the lens blank.

Once the polishing operation has been completed, lens blank 10 is deblocked, or, in other words, block 24 is removed therefrom. This process is familiar to those skilled in the art. Typically, lens blank 10 is placed in a deblocking ring 28 as shown in FIG. 9. Deblocking ring 28 typically is a ring with a hole 30 passing through the center thereof. Block 24 is inserted into hole 30, and lens blank 10 sits on lip 32 of hole 30. Thereafter, ring 28 is rapped against a surface until block 24 falls off. Alternatively, as is well known to those skilled in the art, block 24 may be removed from lens blank 10 by heating and melting thereof.

Figure 10:
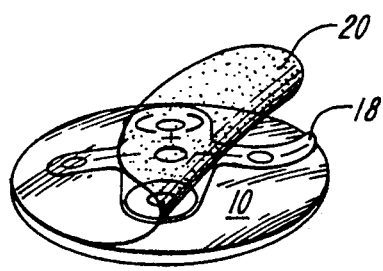
FIG. 10 is a pictorial view of the lens blank illustrating removal of the tape.

Once block 24 has been removed, tape 20 is peeled off convex surface 13 of lens blank 10, along with mask 18, as shown in FIG. 10. Since mask 18 is bonded directly to tape 20, the two come off in unison. As can be seen in FIG. 10, the ink markings remain without any damage thereto during the grinding process. As a result, the lens can be quickly and readily inspected and aligned by the technician for edging of the lens to the proper size and shape to fit a frame in the proper orientation. The additional step of remarking the lens blank after the grinding step has been eliminated. Additionally, the manufacturer no longer needs to place markings on lens blank 10 which are visible only under ultraviolet light.

Mask 18 must be sufficiently large, so that all markings 12 which are desired to be protected from removal are covered completely by mask 18. However, mask 18 should not be so large that it covers the entire surface area of surface 13. Mask must also be capable of adhering to surface 13 of lens 10 so that once in place, it will not shift prior to or during application of tape 20. However, mask 18 must not adhere so securely to surface 13 that it binds to the ink of markings 12 and removes markings 12 when peeled away. Additionally, mask 18 must be able to withstand temperatures of at least 117° Fahrenheit without melting or disintegrating, and it must be capable of easy application by the technician. Preferably, mask 18 is formed of a transparent or translucent material to permit alignment thereof with markings 12, although it need not be transparent or translucent.

A preferred material for mask 18 is a static cling vinyl which is a highly plasticized vinyl. Such a product clings tightly to a surface without the need of adhesive. A preferred product can be purchased from Flexcon Company, Inc. of Spencer, Mass. under the product designation Flexmask CV series films.

In another embodiment, mask 18 can be formed of any suitable material which meets the criteria set forth above and which includes a very low tack adhesive applied to one side of mask 18 for adhesion thereof to lens blank 10. In this embodiment, mask 18 can be formed of any material which is suitable for use as a carrier for a low tack adhesive. One acceptable material for this embodiment is a polyethylene film. A suitable commercially available product can be obtained from Dow Chemical USA under the product name Dow Adhesive Film 899. Examples of low tack adhesives which may be used include a styrene-isoprene rubber solution and a solution of an acrylic copolymer in ethyl acetate and hexane. Typical performance properties of an acceptable low tack adhesive include a 180° peel of about 1.2 to 6.5 piw and a Polyken Tack of 630 to 940 grams. An acceptable acrylic copolymer is 2-propenoic acid, 2-ethylhexyl ester, polymer with 2-hydroxyethyl 2-propenoate and methyl 2-propenoate. Typical properties of this acrylic copolymer adhesive include a very light yellow color, 40–42% total solids, a viscosity of about 2,500–5,100 cps, a flash point of 34° F. and a solvent containing about 79% ethyl acetate and about 25% hexane. The acrylic copolymer solutions are mixed with a catalyst to achieve the low tack performance desired. For example, with an acrylic copolymer solution, a catalyst such as a polymeric isocyanate can be used. About 0.05% to about 1.5% catalyst may be added on the resin solids immediately prior to coating to achieve the desired low tack performance. An acceptable, commercially available acrylic copolymer solution is sold under the trademark GELVA® Multipolymer Resin Solution 1151 by Monsanto. A rubber solution typically comprises a synthetic rubber based pressure sensitive adhesive which has a toluene solvent. Typical properties include about 45±2% solids, a viscosity in the range of about 6,500 to 17,000 cps and a slight amber color. A coating weight of 11.4–13.6 pounds per ream is typical. A commercially available product is sold under the trademark MORSTIK® by Morton International.

As described above, mask 18 can have any shape desired so long as all the necessary markings on lens blank 10 are covered. It is also desired that mask 18 cover as small a surface area of convex surface 13 of lens blank 10 as is necessary, so as to maximize the adhesion of tape 20 to lens blank 10 to minimize any possibility that tape 20 could come loose from lens blank 10 during either the grinding or polishing process. Therefore, as illustrated in FIG. 2, a preferred shape for a progressive lens is that of a cross having four lobes 34, 35, 36 and 37 disposed about center point 38. Lobes 34 and 35 are generally parallel to one another, but are perpendicular to lobes 36 and 37. Typically, top and bottom lobes 34 and 35 have a width greater than the width of lobes 36 and 37. However, lobes 34 and 35 have a shorter length or they extend a shorter distance from center point 38 of mask 18 than do lobes 36 and 37. Lobes 36 and 37 are typically mirror images of one another. Lobe 35 typically extends a greater distance from center point 38 than does lobe 34. Lobe 35 is associated with the near power reference point, circle 25, while lobe 34 is associated with the distance power reference point, parentheses 23. The distance power reference point is usually closer to the center than is the near power reference point. For reference purposes, examples of the dimensions of mask 18 will be provided. In a preferred embodiment, lobes 36 and 37 extend 31 mm from center point 38 and each has a width of 10 mm. Lobe 34 extends 19 mm from center point 38 to its outer end, and has a width of 18 mm. Lobe 35 extends 23 mm from center point 38 and also has a width of 18 mm. However, it is to be understood that by providing such examples, the scope of the claimed invention is in no way limited.

Figure 11:
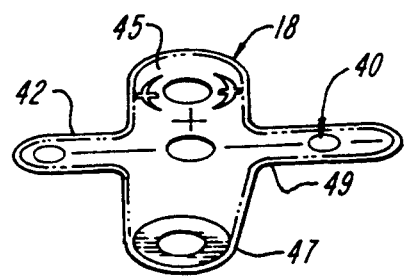
FIG. 11 is a top plan view of an alternative embodiment of the mask of this invention.

As illustrated in FIG. 11, in one embodiment, mask 18 has a visually observable, preferably colored, band or halo 42 extending around the outer perimeter thereof. Halo 42 can be printed or otherwise marked on mask 18 and is required only if mask 18 is transparent or translucent. Halo 42 allows proper placement of the mask by the technician, by rendering the edges thereof more easily visible to the naked eye.

In another alternative embodiment, also illustrated in FIG. 11, markings 40, which are the same as markings 12 found on lens blank 10, can be placed on mask 18. Markings 40 include parentheses 45 or a distance power reference point, circle 47 or a near power reference point, and lines 49. Markings 40 have the same orientation, size and shape as markings 12 to allow proper alignment of mask 18 on lens blank 10. Halo 42 of FIG. 11 may be used with or without markings 40 on mask 18.

In view of the above description, it is likely that modifications and improvements will occur to those skilled in the art which are within the scope of this invention. The above description is intended to be exemplary only, the scope of the invention being defined by the following claims and their equivalents.

What is claimed is:

1. A method of preparing prescription eyeglass lenses having removable markings on one surface thereof, the one surface having an outer edge defining a perimeter of the one surface, said method comprising the steps of:

placing a mask over the markings on the one surface of the lens, the mask covering an area which is less than a total area of the one surface of the lens, said mask not extending beyond the perimeter of the one surface of the lens;

removably adhering a second layer of material to the one surface of the lens, the second layer of material completely covering the mask;

securing to the second layer of material a member adapted for grasping and holding the lens, the member contacting only the second layer of material and not the mask;

grinding the lens to a desired prescription while grasping the member in a grinding machine;

removing the member;

removing the mask and the second layer of material from the one surface of the lens; and aligning the lens in its desired frame using the markings.

2. The method as recited in claim 1 wherein said placing step includes the step of covering with the mask only portions of the one surface of the lens which contain the markings and not covering portions of the one surface of the lens which contain no markings.

3. The method as recited in claim 1 wherein the mask is nonadhesively secured to the one surface of the lens.

4. The method as recited in claim 1 wherein the second layer of material is adhesively secured to the one surface of the lens.

5. The method as recited in claim 1 further comprising the step, prior to said placing step, of aligning markings on the mask with the markings on the one surface of the lens.

6. A structure secured to an optical lens which is adapted to be grasped for holding of the lens during grinding thereof to a desired prescription, the lens having two generally parallel, opposed faces, a first one of the faces having removable markings thereon for alignment and having an outer edge defining a perimeter of the first face, the second one of the faces being exposed for grinding thereof, said structure comprising:

a mask covering the markings on the first face of the lens, said mask not extending beyond the perimeter of the first face of the lens;

a second layer of material adhesively secured to the first face of the lens and completely covering said mask; and a rigid member removably bonded to said second layer of material, said rigid member being in engagement only with said second layer of material and not in engagement at any point with said mask.

7. The structure as recited in claim 6 wherein said mask is transparent.

8. The structure as recited in claim 6 wherein said mask has markings thereon which can be aligned with the markings on the first face of the lens.

9. The structure as recited in claim 6 wherein said mask comprises a visually observable band extending around an outer perimeter thereof.

10. The structure as recited in claim 6 wherein said mask is removably secured to the first face of the lens without the use of adhesives.

11. The structure as recited in claim 6 further comprising a layer of a low tack adhesive disposed between said mask and the first face of the lens.

12. The structure as recited in claim 6 wherein said mask has a shape which conforms to the orientation and shape of the markings on the first face of the lens.

13. The structure as recited in claim 12 wherein said mask has the shape of a cross.

14. The structure as recited in claim 6 wherein said second layer of material comprises a layer of a plastic, stretchable adhesive tape.

15. The structure as recited in claim 10 wherein said mask is formed of a static cling vinyl.

16. A structure adapted to be removably secured to one face of an optical lens having removable markings thereon, the one face having an outer edge defining a perimeter, the structure being adapted to be grasped for holding the lens in a desired position during grinding of a second face of the lens disposed on a side of the lens opposite of the one face of the lens, said structure comprising:
   a transparent, non-adhesive mask covering the markings on the one face of the lens, said mask not covering at least some portions of the one face of the lens not having markings thereon, said mask not extending beyond the perimeter of the one face of the lens;
   a layer of adhesive tape secured on one side thereof to the one face of the lens and completely covering said mask; and
   a block bonded to an outwardly facing side of said adhesive tape opposite of the one side of said adhesive tape, said block engaging said layer of adhesive tape and not said mask.

* * * * *